April 14, 1936.  T. C. VAN DEGRIFT  2,037,443
DYNAMIC BALANCING MACHINE
Filed Feb. 12, 1934  3 Sheets-Sheet 3
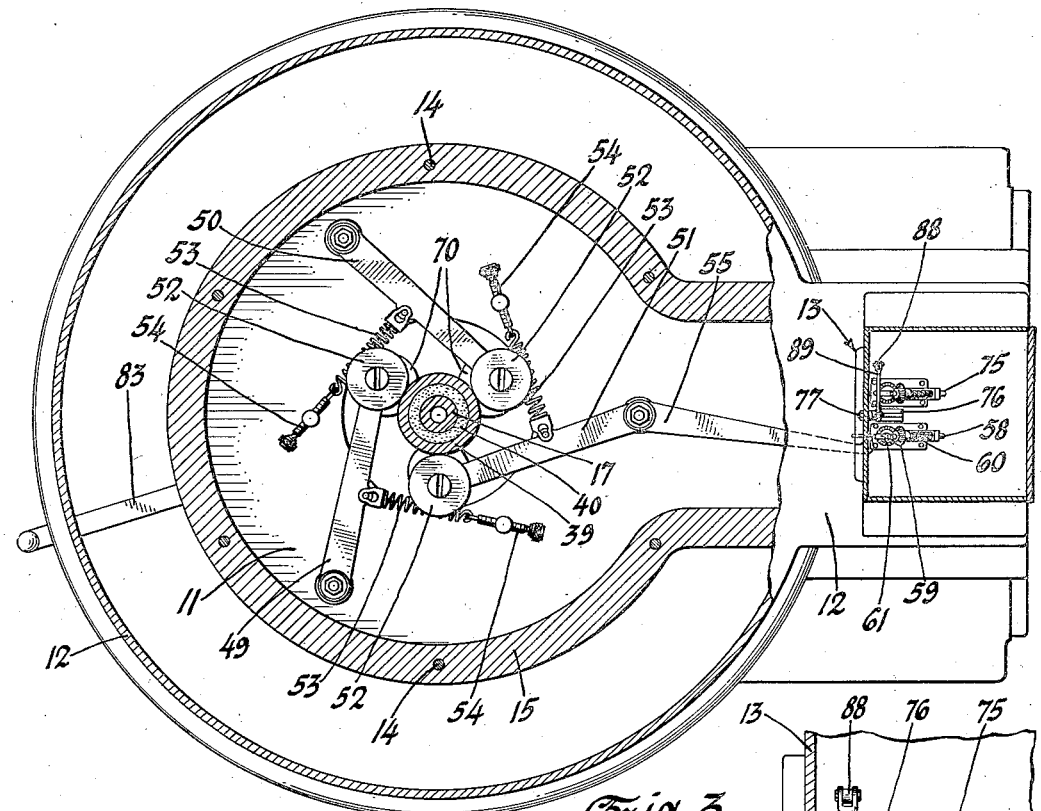
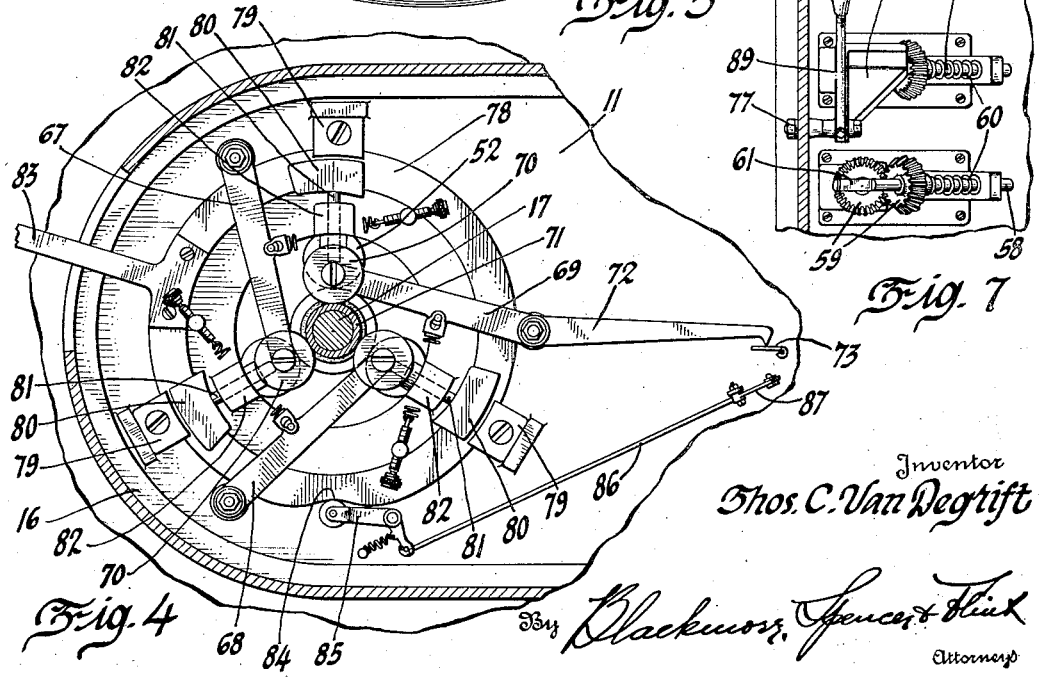
Inventor
Thos. C. Van Degrift
By Blackmore, Spencer & Flint
Attorneys Patented Apr. 14, 1936

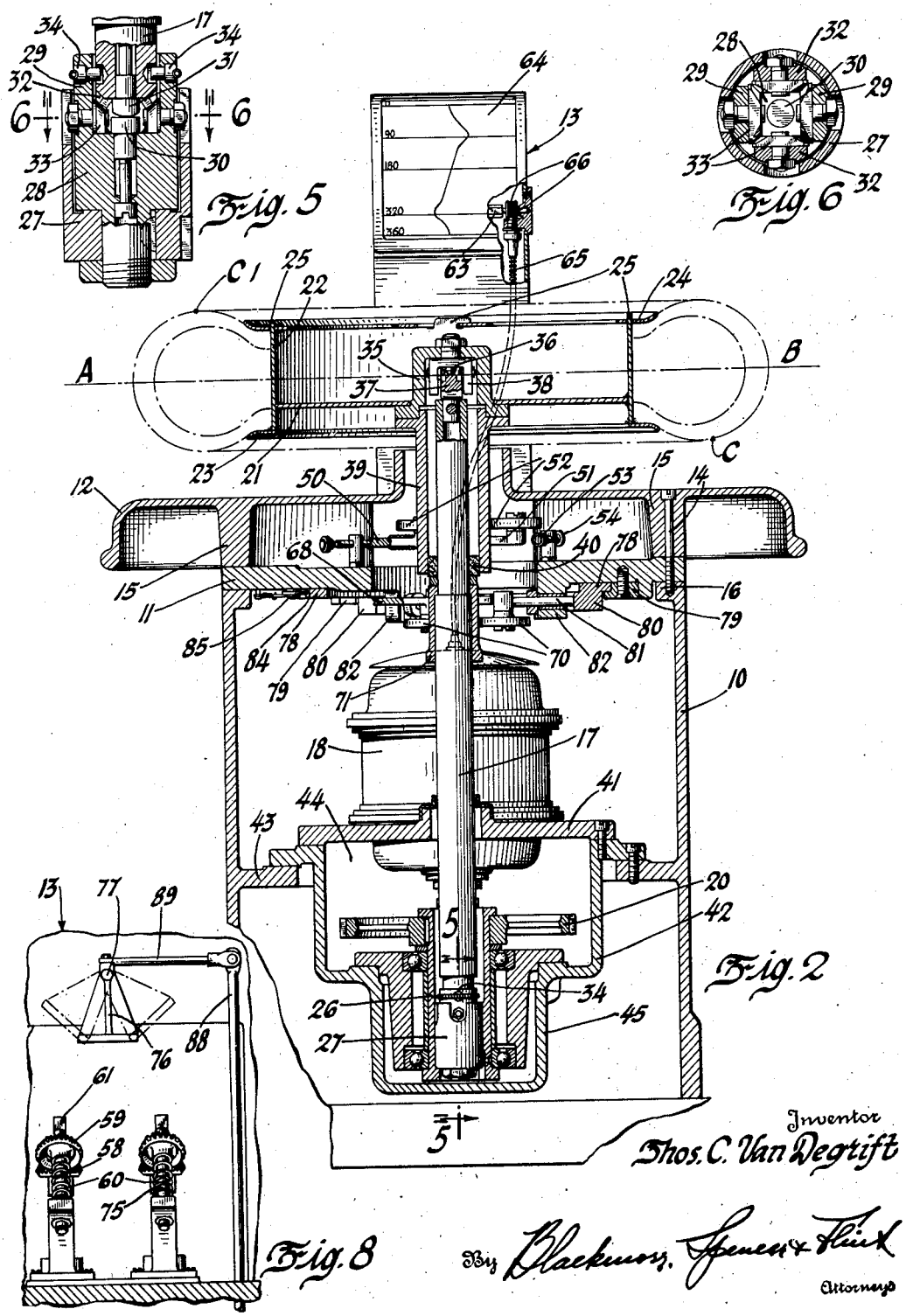

2,037,443

UNITED STATES PATENT OFFICE 2,037,443

DYNAMIC BALANCING MACHINE

Thomas C. Van Degrift, Detroit, Mich., assignor to General Motors Corporation, Detroit, Mich., a corporation of Delaware Application February 12, 1934, Serial No. 710,858

10 Claims. (Cl. 73—51)

My invention relates to balancing machines designed to balance pulleys, clutches, motor vehicle wheels, tires and like devices wherein it is important that the forces set up therein when they are in use, and running at the speed at which they are intended to run, shall be properly balanced; and the object thereof is to provide an improved machine or device for that purpose, and wherein a more perfect balancing of the thing to be balanced is secured than has heretofore commonly been the case. The particular embodiment of my invention herein described and claimed is designed to secure running balance in tires for automobiles and like motor driven vehicles, but as stated my invention is likewise capable of use to balance other devices which rotate at a high speed when in use, among which are flywheels, clutches, vehicle wheels in their entirety, and similar things.

In the drawings accompanying and forming a part of this application, and wherein the preferred form of my invention is illustrated:

Figure 2 is a similar sectional view upon a plane at right angles to the plane of Figure 1 and designated by the line 2—2 thereof.

Figure 3 is a view showing a section upon a horizontal plane indicated by the line 3—3, Figure 1, looking down.

Figure 4 is a view showing a section upon a horizontal plane indicated by the line 4—4, Figure 1, looking up.

Figure 5 is a sectional view upon a larger scale upon a plane indicated by the line 5—5, Figure 2.

Figure 6 is a view showing a section upon a plane indicated by the line 6—6, Figure 5.

Figure 7 is a fragmentary view showing certain mirror mechanism of my device several times enlarged over the showing of the same parts in Figures 1 and 3, and looking down upon them.

Figure 8 is a fragmentary view at about the same scale as Figure 7, and showing said mirror mechanism as seen from a plane indicated by the line 8—8, Figure 1.

Figure 1:
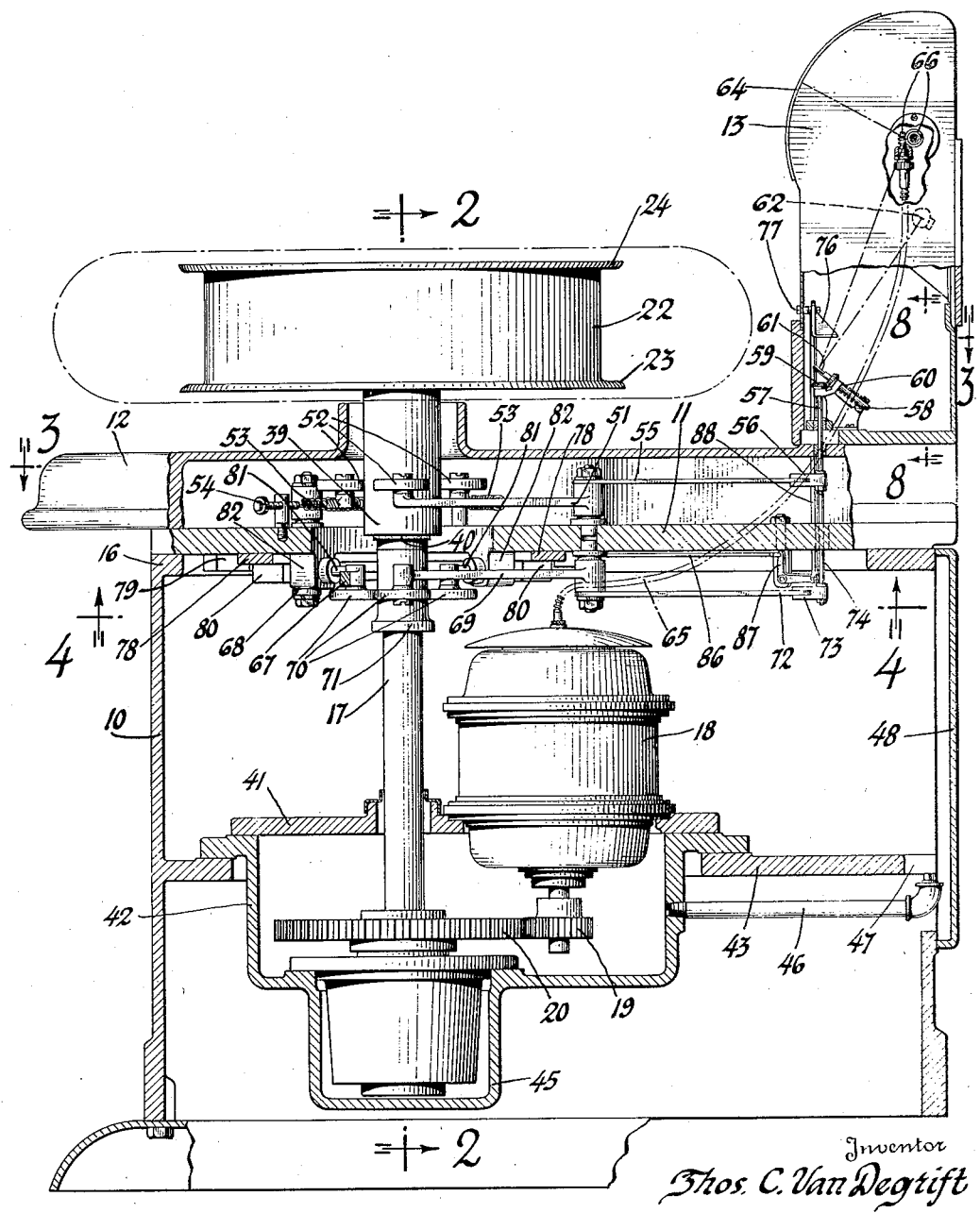
Figure 1 is a view showing a section of my improved balancing machine, taken upon a vertical centrally located plane.

Referring to the drawings, the numeral 10 designates a hollow pedestal or base which serves as a casing within which the motor and main shaft of my improved balancing machine are housed; 11 is a plate secured to the open upper end of this casing and which serves as a support for various of the parts of my device, some being upon the upper and others upon the underside thereof; and 12 is a guard and cover above the plate 11 and which defines the upper end of the machine except that certain optical indicating mechanism thereof is arranged within a mirror housing 13 supported by the cover and extending upwardly therefrom. The cover encloses and protects such mechanism as is arranged upon the upper side of the plate 11, and the mechanism upon the underside of said plate is within the upper part of the casing 10. These parts are secured together by bolts 14 extending through an internal depending rib 15 of the cover 12 and through the plate 11 and into a flange 16 at the upper end of the pedestal 10 as shown in Figure 2.

The numeral 17 designates the vertically arranged main shaft of my improved balancing device, the same being driven by the electric motor 18 through intermeshing gears 19, 20, and the upper end of which shaft extends through a hole in the plate 11 and is provided with a carrier suitable for supporting whatever article, thing or device is to be balanced by the use of my balancing mechanism. In the form thereof illustrated the carrier is made up of a disc 21 and rim 22, a lower flange 23 fixed to the rim and an upper flange 24 detachable from the rim but driven therefrom through lugs 25; the carrier being designed to support motor vehicle tires to be balanced in the embodiment of my invention herein described.

The driving shaft 17 is pivotally suported so as to be capable of slight angular swinging movement about its lower end as a definitely positioned point. The driving mechanism therefor comprises therefore a sleeve 26 rotatably supported by ball bearings at its upper and lower ends and to which the gear 20 is fastened, and which sleeve has within its lower end a driving jaw support 27; the two rotating together but made as separate parts for convenience of manufacture and assembly. Within the support 27, see Figures 5 and 6, and driven thereby and therefore by the sleeve 26 is a supporting and driving member 28 having upwardly extending driving jaws 29, and which member supports a hardened pivot 30. The lower end of the shaft 17 has a cooperating hardened pivot 31, and depending driven jaws 32 with which the jaws 29 cooperate to drive said shaft. The driving is through hardened steel blocks 33 carried by the jaws, and the engaging faces of these blocks are curved slightly, so that the shaft is capable of slight angular movement about the support provided by the pivots 30, 31 without binding between the cooperating pairs of driving and driven blocks 33. Spring retained pins 34 at the upper ends of the jaws 29 enter holes in the lower end of the shaft 17 to prevent accidental disengagement of said lower end from its driving mechanism.

The disc 21 of the support for the thing being balanced is fastened to a cup-shaped driving member 35; and this member is pivotally supported upon the upper end of the driving shaft 17 at 36, and is driven through driving and driven lugs 37, 38 so that the member 35 may move angularly to a slight extent relative to the pivotal support at 36. This pivoting and driving mechanism at the upper end of the shaft 17 is shown simplified, and somewhat conventional, but in the actual machine substantially the same pivoting and driving devices are used at both the lower and upper end of the shaft 17. Secured to the driving member 35 is a depending sleeve 39 which rotates with and partakes of the angular movement of said member permitted by the pivotal support 36 and driving mechanism therefor aforesaid, and 40 designates a soft rubber ring between the lower end of said sleeve and the driving shaft.

The motor 18 is supported upon the cover 41 of a gear housing 42 which in turn is supported in an opening in a transverse wall 43 within the pedestal 10, whereby a chamber 44 is provided which contains the gears 19, 20, and in a depending part 45 of which housing the bearing for the lower end of the driving shaft 17 is arranged, whereby the gearing and bearing run in oil supplied through a pipe 46; and there is a passage through the partition 43 at 47 so that any oil which finds its way into the upper part of the hollow pedestal or casing 10 may drain into the lower part of the pedestal, below the transverse wall 43. Access to the interior of the pedestal may be had by removing a cover plate 48, Figure 1, as will be understood.

Pivotally supported upon the upper side of the plate 11, see Figure 3, are three arms 49, 50, 51, these having rollers 52 at their free ends which are drawn into contact with the sleeve 39 by tension springs 53 operatively connected with the arms as shown, and the free ends of which springs are anchored by screws 54 which are adjustable in posts carried by the plate; whereby the restraint due to the rollers to angular movement of the sleeve 39 about the upper pivot 36 may be varied. The arm 51 has an extension 55 the extremity of which pushes against an arm 56 at the lower end of a vertical shaft 57 through which angular movement is transmitted to a mirror operating shaft 58 through gears 59, lost motion at the gears being taken up by a spring 60 acting to oppose angular movement of the mirror shaft. An oscillatable mirror 61 carried by the mirror shaft 58 reflects light emanating from a lamp 62 onto a rotating octagonal mirror 63 whereby the beam is spread and appears as a line upon a translucent screen 64 of the mirror housing 13. The rotating mirror is driven by a flexible shaft 65 through a worm and worm gear at 66, said flexible shaft being driven by the armature shaft of the motor 18. The ratio of the gears 19, 20 is one to four, and that of the worm gearing at 66 one to thirty-two, so that each face of the octagonal mirror moves the beam of light reflected therefrom throughout the length of the screen 64 each rotation of the driving shaft 17 and of the part which is being balanced.

Pivotally supported upon the underside of the plate 11, see Figure 4, are three arms 67, 68, and 69 which are acted upon by springs (shown in part, but not numbered) precisely as in the case of the arms upon the upper side of the plate. These arms have rollers 70 at their free ends which are held against a hardened sleeve 71 upon the shaft 17 by the springs aforesaid. The arm 69 has an extension 72 the end of which pushes against an arm 73 at the lower end of a second vertically arranged shaft 74 through which movement is transmitted to a second oscillatable mirror operating shaft 75, precisely as hereinbefore explained in describing the operation of the first mirror operating shaft 58; the two mirrors, see Figure 3, being alike as regards the operating mechanisms and as regards their projection of beams of light onto the rotating mirror 63.

One only of the oscillatable mirrors carried by the shafts 58, 75 is in use at a time to which end an oscillatable light shield 76 is provided, the same being pivotally supported at 77 by the mirror housing 13. This shield intercepts the beam of light reflected by one or the other of said mirrors so that one of the reflected beams will not reach the rotating mirror 63; and the operating mechanism for this light shield is combined with means for positively holding the rollers 70 against the sleeve 71 so as to prevent angular movement of the shaft 17 about the pivotal support at the lower end thereof, the arrangement being such that when the rollers are held in engagement with the sleeve light from the mirror carried by the shaft 75, see Figure 7, is intercepted by the light shield.

The holding mechanism for the rollers 70 comprises an oscillatable cam ring 78 held against the underside of the plate 11 by clips 79, and which ring carries three cams 80 which engage the outer ends of plungers 81. These plungers slide in guides 82 depending from the plate 11, and their inner ends engage enlarged bosses at the free ends of the arms 67, 68, 69 provided for receiving the threaded ends of the screws which fasten the rollers 70 to the arms.

The cam ring 78 is operated by a handle 83 which extends outside the casing 10. When the parts are in the positions shown in Figure 4 the rollers 70 are held against the sleeve 71 and angular movement of the shaft 17 about the lower pivotal support provided by the pivots 30, 31 is prevented, whereas movement of the handle 83 upward moves the cams 80 out of holding engagement with the outer ends of the plungers 81 and the shaft 17 will be no longer held against angular movement by the rollers.

The cam ring 78 has a peripheral depression at 84 which provides a cam surface for operating a bell crank lever 85 pivotally supported from the underside of the plate 11, and 86 designates a rod connecting said bell crank with a second similarly supported bell crank 87, for operating the latter. This second bell crank operates a vertically extending rod 88 the upper end of which is pivotally connected with the arm 89 of the oscillatable light shield 76. When the parts are in the positions shown (with the shaft 17 held against angular movement) the light shield 76 intercepts the light ray reflected by the mirror carried by the mirror shaft 75, see Figure 7, and the line or curve (assuming the machine to be running) seen upon the screen 64 will be due to the mirror carried by the mirror shaft 58; and its form, as will be appreciated, will be determined by the extent of the angular movement of the lower end of the sleeve 39 about the pivotal support 36 at the upper end thereof as the axis of said sleeve assumes a position at more or less of an angle to the axis of the shaft 17 dependent upon the location of an assumed unbalanced mass in the tire or whatever is being balanced, and upon the speed of rotation of said shaft 17. When, however, the handle 83 is moved as aforesaid to release the shaft 17 from the holding action of the cams 80 and rollers 70 the arm 89 acts to swing the shield 76 from its position shown in Figure 7 into a new position over, and in which it intercepts the ray reflected by the mirror carried by the mirror shaft 58, and the line or curve seen upon the screen 64 will be due to the mirror carried by the shaft 75 angular movement of which mirror is due to movement of the shaft 17 about the pivotal support 30—31 at the lower end thereof. When the machine is running with the upper end of the shaft 17 released from the holding action of the cams 80 and rollers 70, said shaft 17 (assuming an unbalanced mass in the thing being balanced) takes up a position with its axis of rotation at more or less of an angle to its geometrical axis, the extent of such angular movement being likewise dependent upon the location of the unbalanced mass and upon the speed of rotation of said shaft. When the machine is running under the conditions last mentioned the rollers 52 will to be sure be operated by the sleeve 39, and the mirror carried by the shaft 58 will be oscillated; but no light will be reflected therefrom to the rotating mirror 66 and onto the screen 64 because of the ray intercepting action of the light shield 76.

In view of the premises and with the parts in the positions in which they are shown the upper end of the shaft 17 is restrained from angular movement by the rollers 70, but the sleeve 39 is free to tip about the pivotal support 36, which lies in or as near as practicable in the central plane A—B Figure 2 of rotation of the vehicle tire or other thing to be balanced; and with reference to which plane parts of the tire upon one side of the plane balance parts upon the other side, when the tire is properly balanced. The tire or other device is rotating with the shaft 17 and support 21; and if there is a part thereof which is unbalanced about the plane A—B, as at C, then the force due to such unbalanced part will have a radial component lying without, that is below the plane A—B, which force or component will tend to tip the support 21, 22, 35 upon the pivot 36 and move the lower end of the sleeve 39 to the right. The soft rubber ring 40 permits this movement and eccentricity of said lower end, relative to the shaft 17, and due to such tipping, will result in the pushing outward of the roller 52 of the arm 51, and in angular movement of the mirror shaft 58 as hereinbefore explained.

If there is no displacement of the lower end of the sleeve 39, that is if it runs concentric with the shaft 17, the trace of the beam of light upon the screen 64 will be a straight line. With an unbalanced mass or heavy region or part offset from the plane A—B, however, as indicated at C, the outwardly displayed portion of the sleeve where the rollers 52 contact therewith will produce a hump to one side of what with concentricity between the sleeve and shaft 17 would be a straight line on the screen 64, see Figure 2, and the opposite inwardly displaced part of said sleeve will be registered as a depression in such a line. Such an unbalanced part as is indicated at C will therefore result in a curve upon the screen 64 of the general shape of the curve shown thereon in Figure 2, which as a matter of course is repeated for each rotation of the shaft 17 as each face of the rotating mirror 63 sweeps the ray of light reflected therefrom along the length of the screen and corresponds with one rotation of said shaft.

The screen 64 is graduated to indicate one rotation of the shaft 17, and the rotation of the carrier is assumed to be clockwise with 12 o'clock as a zero or starting point assumed to be just in front of the mirror housing 13. The hump in the curve on the screen and the depression 180° therefrom therefore indicate that the heavy part C is 90° ahead of the 0° (12 o'clock) position, because the roller at the free end of the arm 51 engages the sleeve 39, 90° ahead of the mirror housing, Figure 3, and moves to the right in the plane of the drawing, Figure 2, which is out perpendicular to the drawing in Figure 1.

As a matter of course such unbalance when running as may be present in whatever is being balanced will be localized in a region of more or less area, rather than concentrated at a point, so that the hump and depression in the resulting curve indicate a heavy region rather than a definite point. Such region having been located, mass may be added to counteract the unbalance due to such a heavy region as by adding material at a region 180° therefrom, and upon the other side of the plane A—B, as at C'; or material may be removed from the heavy region especially when metallic things like flywheels, pulleys, clutches, etc. are being balanced. In either method and after such repeated trials as may be necessary a condition of running balance may be established in the device being balanced, in which case the sleeve 39 will run concentric with the shaft 17 and the trace of the beam of light due to the mirror 61 upon the screen 64 will be a straight line.

The tire is marked before starting to balance it, and the mark is definitely placed relative to the machine; for example centrally in front of the mirror housing, which corresponds with 12 o'clock or 0° of rotation and with the top of the scale on the screen 64. The machine is then run and the position of the hump and depression in the curve appearing on the screen is noted. The tire will of course stop in some indefinite position but the mark thereupon enables the operator to rotate it into its initial position, and the remembered location of the hump and depression in the curve seen while the machine was running enables the operator to mark the location at which material must be added or removed to establish a condition of running balance therein. For example, the curve shown indicates excess material 90° ahead (clockwise) of the mirror housing.

It will be appreciated that the further above or below the plane A—B the mass to be balanced is concentrated, the greater will be its effect in tilting the support for the tire or other device about the pivot 36; and that a heavy region concentrated at some definite part of the circumference but acting directly in said plane A—B will have little tendency to tilt the support upon the pivot 36 while the machine is running, and will make no record upon the screen 64 other than a straight line. This disregards the force of gravity acting parallel to the shaft 17, and gravity is disregarded as the whole analysis of the machine is based upon the assumption that it is running. Gravity due to excess of mass, wherever located, whether above the plane A—B or below the same or in said plane, will tend to tip the support for the thing being balanced upon the pivot 36; but vertical force due to gravity of any unbalanced mass, wherever it may be concentrated, will be very much less than radial force due to the same mass when the machine is in operation, and may be disregarded as the end to be attained is the balancing of forces acting radially (parallel to the plane A—B) when the device which is being balanced is rotating.

In the practical use of the machine and after the tire or other device has been balanced as hereinbefore explained as regards offset forces acting to one side of the plane A—B (so that the curve upon the screen 64 becomes a straight line or departs but little therefrom) such unbalanced forces as act in said plane, or so close to it as to have negligible effect in tilting the tire and support therefor about the pivot 36, will be of small magnitude, and such unbalanced condition as may be due to them may be disregarded. These forces, however, and in fact all such remaining conditions of unbalance as result in radial forces acting in or substantially in the plane A—B, will be made manifest by releasing the shaft 17 from the holding action of the rollers 70 carried by the arms upon the underside of the plate 11. The tire having been nearly if not completely balanced as aforesaid the sleeve 39 will now run concentric with the shaft 17, as the resistance of the rubber ring 40 is sufficient to restrain tipping, due to forces not wholly balanced, of the support about the pivot 36. The shaft 17 is now free to move angularly about the pivot bearing 30, 31 at the lower end thereof; and if any unbalanced forces remain they will result in the tipping of the shaft 17 about the said pivot and in the communication of oscillating movement to the mirror shaft 75 and the mirror carried thereby (the ray from the mirror carried by the shaft 58 being now intercepted by the shield 76), and such tipping will produce the same general form of curve on the screen 64 as was produced by the tilting of the sleeve 39. Obviously and because the residual unbalanced forces here contemplated act through an arm measured by the whole length of the shaft 17 (which is much longer than the sleeve 39) such still unbalanced forces will produce much greater movement of the mirror carried by the shaft 75, than could be produced by the sleeve 39 acting as aforesaid to oscillate the mirror carried by the mirror shaft 58. In fact forces quite insufficient to oscillate said last mentioned shaft will, when the upper end of the shaft 17 is released from the holding action of the cam ring 78, the cams 80, and the rollers 70, produce pronounced oscillation of the mirror carried by the mirror shaft 75. The tire or other device is therefore very nearly balanced during the running of the machine with the shaft 17 restrained, and by the use of the sleeve 39, so that little additional balancing is necessary when the said shaft is freed from the holding action of the rollers 70; and the much more sensitive condition of the machine due to the freedom of the shaft 17 when released to move about the pivot at the lower end thereof serves in most cases more to indicate how closely the tire is in running balance, than as an indication that further balancing is necessary. However and if the curve traced during operation with the shaft 17 released from the holding action of the rollers 70 indicates a condition of unbalance which needs to be corrected a hump and depression therein will indicate the location of excess material, and a more exact condition of balance may be secured by adding material 180° from the heavy region or by removing material at the heavy region, precisely as hereinbefore explained; so that conditions of unbalance not indicated when operating with the shaft 17 restrained by the rollers 70, and which are ordinarily corrected during balancing with the said shaft restrained and by noting angular movement of the mirror carried by the shaft 58 due to an eccentric position assumed by the lower end of the sleeve 39, are made manifest when said shaft 17 is released and may be corrected by further addition to or removal of material from whatever article or device is being balanced.

Having thus described and explained my invention I claim and desire to secure by Letters Patent:

1. In a balancing device, a vertically arranged shaft and driving means therefor; a pivot at the lower end thereof and whereby said shaft is supported; a sleeve surrounding the upper part of said shaft and driven thereby, and which sleeve is pivotally supported from the upper end of said shaft; a support for a device to be balanced carried by said sleeve; an oscillatable mirror; means whereby said mirror is oscillated by movement of said sleeve about its pivot support; a second oscillatable mirror; means whereby said second mirror is oscillated by movement of said shaft about its pivot support; a rotating mirror arranged to reflect beams of light reflected to it by said oscillatable mirrors onto a screen; and means for preventing angular movement of said shaft about the pivot support at the lower end thereof.

2. In a balancing device, a vertically arranged shaft and driving means therefor; a pivot at the lower end thereof and whereby said shaft is supported; a sleeve surrounding the upper part of said shaft and driven thereby, and which sleeve is pivotally supported from the upper end of said shaft; a support for a device to be balanced carried by said sleeve; an oscillatable mirror; means whereby said mirror is oscillated by movement of said sleeve about its pivot support; a second oscillatable mirror; means whereby said second mirror is oscillated by movement of said shaft about its pivot support; a rotating mirror arranged to reflect beams of light reflected to it by said oscillatable mirrors onto a screen; a movable light shield arranged to interrupt the light reflected from one or the other of said oscillatable mirrors; and means for preventing angular movement of said shaft about the pivot support at the lower end thereof.

3. In a balancing device, a vertically arranged shaft and driving means therefor; a pivot at the lower end thereof and whereby said shaft is supported; a support for a device to be balanced, said support being pivotally supported from the upper end of said shaft and driven thereby; an oscillatable mirror; means whereby said mirror is oscillated by movement of said support about the pivot whereby said support is supported; a second oscillatable mirror; means whereby said second mirror is oscillated by movement of said shaft about the pivot whereby said shaft is supported; a rotating mirror arranged to reflect beams of light reflected to it by said oscillatable mirrors onto a screen; and means for preventing angular movement of said shaft about the pivot support at the lower end thereof.

4. In a balancing device, a vertically arranged shaft and driving means therefor; a pivot at the lower end thereof and whereby said shaft is supported; a support for a device to be balanced, said support being pivotally supported from the upper end of said shaft and driven thereby; an oscillatable mirror; means whereby said mirror is oscillated by movement of said support about the pivot whereby said support is supported; a second oscillatable mirror; means whereby said second mirror is oscillated by movement of said shaft about the pivot whereby said shaft is supported; a rotating mirror arranged to reflect beams of light reflected to it by said oscillatable mirrors onto a screen; a movable light shield arranged to interrupt the light reflected from either one of said oscillatable mirrors when the other is being used; and means for preventing angular movement of said shaft about the pivot support at the lower end thereof.

5. In a balancing device, a vertically arranged shaft and driving means therefor; a pivot at the lower end thereof and whereby said shaft is supported; a sleeve surrounding the upper part of said shaft and driven thereby, and which sleeve is pivotally supported from the upper end of said shaft; a support for a device to be balanced carried by said sleeve; means whereby eccentricity of the lower end of said sleeve relative to said shaft when the two are rotating is indicated; and means for preventing angular movement of said shaft about the pivot support at the lower end thereof.

6. In a balancing device, a vertically arranged shaft and driving means therefor; a pivot at the lower end thereof and whereby said shaft is supported; a sleeve surrounding the upper part of said shaft and driven thereby, and which sleeve is pivotally supported from the upper end of said shaft; a support for a device to be balanced carried by said sleeve; a rotating mirror driven by the driving means aforesaid for said shaft and arranged to reflect a beam of light onto a screen; an oscillatable mirror arranged to reflect a beam of light onto said rotating mirror; means whereby said oscillatable mirror is operated by said sleeve; and means for preventing angular movement of said shaft about the pivot support at the lower end thereof.

7. In a balancing device, a vertically arranged shaft and driving means therefor; a pivot at the lower end thereof and whereby said shaft is supported; a plate adjacent the upper end of said shaft and having a hole through which said shaft extends; a sleeve surrounding the upper part of said shaft and which sleeve is pivotally supported from the upper end thereof; a support for a device to be balanced carried by said sleeve; pivotally supported arms carried by said plate and the free ends of which engage said sleeve; an oscillatable mirror operated by one of said arms; a rotating mirror driven by the driving means aforesaid for said shaft; and means for preventing angular movement of said shaft about the pivot support at the lower end thereof.

8. In a balancing device, a vertically arranged shaft and driving means therefor; a pivot at the lower end thereof and whereby said shaft is supported; a plate adjacent the upper end of said shaft and having a hole through which said shaft extends; a sleeve surrounding the upper part of said shaft and which sleeve is pivotally supported from the upper end thereof; a support for a device to be balanced carried by said sleeve; pivotally supported arms carried by said plate and the free ends of which engage said shaft; an oscillatable mirror operated by one of said arms; a rotating mirror driven by the driving means aforesaid for said shaft; and means for locking said arms to thereby prevent angular movement of said shaft about the pivot support at the lower end thereof.

9. In a balancing device, a vertically arranged shaft and driving means therefor; a pivot at the lower end thereof and whereby said shaft is supported; a plate adjacent the upper end of said shaft and having a hole through which said shaft extends; a sleeve surrounding the upper part of said shaft and which sleeve is pivotally supported from the upper end thereof; a support for a device to be balanced carried by said sleeve; pivotally supported arms carried by said plate and the free ends of which engage said shaft; an oscillatable mirror operated by one of said arms; a rotating mirror driven by the driving means aforesaid for said shaft; a cam ring carried by said plate and having a plurality of cams; and a plurality of plungers operated by said cams and adapted to engage said arms to thereby prevent angular movement of said shaft about the pivot support at the lower end thereof.

10. In a balancing device, a vertically arranged shaft and driving means therefor; a pivot at the lower end thereof and whereby said shaft is supported; a plate adjacent the upper end of said shaft and having a hole through which said shaft extends; a sleeve surrounding the upper part of said shaft and which sleeve is pivotally supported from the upper end thereof; a support for a device to be balanced carried by said sleeve; pivotally supported arms carried by said plate and the free ends of which engage said shaft; an oscillatable mirror operated by one of said arms; a rotating mirror driven by the driving means aforesaid for said shaft; a cam ring carried by said plate and having a plurality of cams; a plurality of plungers operated by said cams and adapted to engage said arms to thereby prevent angular movement of said shaft about the pivot support at the lower end thereof; a movable light shield arranged to intercept a beam of light reflected by said mirror; and means whereby said light shield is operated from said cam ring.

THOMAS C. VAN DEGRIFT.